United States Patent
Tomiyama

(10) Patent No.: US 9,638,281 B2
(45) Date of Patent: May 2, 2017

(54) LOCK-UP DEVICE FOR TORQUE CONVERTER

(71) Applicant: EXEDY Corporation, Neyagawa-shi, Osaka (JP)

(72) Inventor: Naoki Tomiyama, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/655,147

(22) PCT Filed: Mar. 18, 2014

(86) PCT No.: PCT/JP2014/057270
§ 371 (c)(1),
(2) Date: Jun. 24, 2015

(87) PCT Pub. No.: WO2014/148467
PCT Pub. Date: Sep. 25, 2014

(65) Prior Publication Data
US 2015/0323038 A1    Nov. 12, 2015

(30) Foreign Application Priority Data

Mar. 21, 2013  (JP) .................................. 2013-057718

(51) Int. Cl.
*F16D 3/14*    (2006.01)
*F16F 15/134*    (2006.01)
(Continued)

(52) U.S. Cl.
CPC ...... *F16F 15/1343* (2013.01); *F16F 15/1232* (2013.01); *F16H 45/02* (2013.01);
(Continued)

(58) Field of Classification Search
CPC ... F16F 15/1232; F16F 15/1343; F16H 45/02; F16H 2045/0205; F16H 2045/0221; F16H 2045/0294
(Continued)

(56) References Cited

U.S. PATENT DOCUMENTS 5,996,761 A * 12/1999 Teramae ................. F16H 45/02
                                                    192/3.29 X
6,354,420 B1 * 3/2002 Yabe ..................... F16F 15/1232
                                                    192/3.28 X
(Continued)

FOREIGN PATENT DOCUMENTS

JP    2002-089657 A    3/2002
JP    2003-021219 A    1/2003
(Continued)

*Primary Examiner* — Gregory Binda
(74) *Attorney, Agent, or Firm* — Global IP Counselors, LLP

(57) ABSTRACT

A lock-up device for a torque converter is provided in which torsion springs are appropriately compressed and deformed even when the torsion springs to be used have a shape elongated in a circumferential direction of the lock-up device. The lock-up device includes a drive plate, torsion springs and a driven plate. The drive plate has a fixation part, a plurality of torque transmission parts and a plurality of receiver parts. The fixation part is fixed to a piston. The plural torque transmission parts are formed to extend from the fixation part to an outer peripheral side and contact rotation-directional ends of the torsion spring. The plural receiver parts are formed on an outer peripheral part of the fixation part, support the inner peripheral side parts of the torsion springs on an engine side with respect to the axial centers of the torsion springs, and extend toward a transmission.

4 Claims, 5 Drawing Sheets

(51) Int. Cl.
 *F16H 45/02* (2006.01)
 *F16F 15/123* (2006.01)

(52) U.S. Cl.
 CPC ............... *F16H 2045/0205* (2013.01); *F16H 2045/0221* (2013.01); *F16H 2045/0294* (2013.01)

(58) Field of Classification Search
 USPC .............................. 464/67.1; 192/3.28, 3.29
 See application file for complete search history.

(56) References Cited

U.S. PATENT DOCUMENTS

| | | |
|---|---|---|
| 2012/0247901 A1 | 10/2012 | Kawahara |
| 2013/0288808 A1 | 10/2013 | Maeda et al. |
| 2014/0014453 A1 | 1/2014 | Kawahara et al. |

FOREIGN PATENT DOCUMENTS

| | | |
|---|---|---|
| JP | 2011-016161 A | 1/2011 |
| JP | 2012-022603 A | 2/2012 |
| WO | 2011-070852 A1 | 6/2011 |
| WO | 2012-133816 A1 | 10/2012 |
| WO | 2012-147404 A1 | 11/2012 |

\* cited by examiner

LOCK-UP DEVICE FOR TORQUE CONVERTER

CROSS-REFERENCE TO RELATED APPLICATIONS

This application is a U.S. national stage Application of International Application No. PCT/JP2014/057270, filed Mar. 18, 2014, which claims priority to Japanese Patent Application No. 2013-057718, filed in Japan on Mar. 21, 2013, the entire contents of which are hereby incorporated by reference.

BACKGROUND

Field of Invention

The present invention relates to a lock-up device, particularly to a lock-up device for a torque converter for transmitting a torque from an engine to a transmission-side member and absorbing and attenuating torsional vibration.

Background Information

Torque converters are often equipped with a lock-up device for directly transmitting a torque from a front cover to a turbine. As described in Japan Laid-open Patent Application publication No. 2002-089657, a lock-up device of this type includes a piston capable of being frictionally coupled to the front cover, a drive plate fixed to the piston, a driven plate, a plurality of torsion springs and an intermediate member. The driven plate is fixed to the turbine of the torque converter, and is elastically coupled to the drive plate in a rotational direction through the plural torsion springs.

In the device, the piston is mounted between the front cover and the turbine, and the torque of the front cover is configured to be transmitted to the lock-up device when an annular friction member fixed to the outer peripheral part of the piston is pressed onto a friction surface of the front cover. Accordingly, the torque is transmitted from the lock-up device to the turbine. At this time, variation in torque inputted from an engine is absorbed and attenuated by the plural torsion springs of the lock-up device.

SUMMARY

In the lock-up devices for torque converters, the plural torsion springs are often configured to act in a series-like manner to enlarge a torsion angle of a damper mechanism having a low stiffness. Additionally, each torsion spring also has a circumferentially elongated shape. In such a construction, when a load acts on each torsion spring and compresses each torsion spring, the lengthwise directional middle part of each torsion spring is deformed and displaced to the inner peripheral side. In such a condition, appropriate torsional characteristics cannot be obtained, and this makes it impossible to effectively absorb and attenuate variation in torque.

It is an object of the present invention to enable torsion springs to be appropriately compressed and deformed in a lock-up device for a torque converter even, especially, when the torsion springs to be used have a shape elongated in the circumferential direction of the lock-up device.

Additionally, it is another object of the present invention to inhibit degradation in strength in a construction that torsion springs are prevented from being deformed and displaced to the inner peripheral side.

A lock-up device for a torque converter according to a first aspect of the present invention is a device for transmitting a torque from an engine to a transmission-side member and absorbing and attenuating a torsional vibration, and includes an input rotary member, an output rotary member and a plurality of elastic members. The output rotary member is rotatable relatively to the input rotary member and is coupled to the transmission-side member. The plural elastic members elastically couple the input rotary member and the output rotary member in a rotational direction. Furthermore, the input rotary member includes a fixation part, a plurality of torque transmission parts and a plurality of receiver parts. The fixation part is attached to a member to which the torque is inputted from the engine. The plural torque transmission parts are formed to extend from the fixation part to an outer peripheral side, and contact rotation-directional ends of the elastic members. The plural receiver parts are formed on an outer peripheral part of the fixation part, support inner peripheral side parts of the elastic members on an engine side with respect to axial centers of the elastic members, and extend toward a transmission.

In the present device, the torque inputted into the input rotary member is transmitted to the output rotary member through the plural elastic members. The inner peripheral side parts of the plural elastic members are herein supported by the receiver parts of the input rotary member.

The receiver parts of the input rotary member herein support the inner peripheral side parts of the elastic members on the engine side with respect to the axial centers of the elastic members, and extend toward the transmission. Hence, when the elastic members are compressed and deformed, the parts of the elastic members, located on the inner peripheral side with respect to the axial centers, are supported by the receiver parts, and the elastic members can be prevented from being deformed and displaced to the inner peripheral side. Therefore, desired torsional characteristics can be obtained.

A lock-up device for a torque converter according to a second aspect of the present invention relates to the device of the first aspect, and wherein the fixation part has a disc shape. Furthermore, the plural receiver parts are formed by bending the outer peripheral part of the fixation part toward the transmission, and in each of the plural receiver parts, a bent part is processed by means of restriking except for both circumferential ends thereof.

The receiver parts are formed by bending the outer peripheral part of the fixation part, and simultaneously, are processed by means of restriking except for the circumferential ends thereof. Hence, the receiver parts can reliably receive the parts of the elastic members located on the engine side with respect to the axial centers. Consequently, when the elastic members are compressed and deformed, the center parts of the elastic members in the circumferential direction can be reliably prevented from being deformed and displaced to the inner peripheral side.

When each receiver part is herein entire-circumferentially processed by means of restriking, a stress concentrates on the both circumferential ends of each receiver part processed by means of restriking, and the strength of each receiver part remarkably degrades.

However, the both circumferential ends of each receiver part are not herein processed by means of restriking. Thus, stress concentration can be avoided, and degradation in strength of each receiver part can be inhibited.

A lock-up device for a torque converter according to a third aspect of the present invention relates to the device of the second aspect, and wherein in each of the plural receiver parts, the bent part has a larger fillet radius in the both circumferential ends thereof than in the remainder thereof processed by means of restriking.

In each receiver part, the bent part herein has a larger fillet radius in the both circumferential ends thereof than in the remainder thereof. Hence, stress concentration on the circumferential ends can be avoided, and degradation in strength of each receiver part can be inhibited.

A lock-up device for a torque converter according to a fourth aspect of the present invention relates to the device of any of the first to third aspects, and further includes an intermediate member that is rotatable relative to the input rotary member and the output rotary member and causes at least two of the plural elastic members to act in a series-like manner.

The intermediate member is herein mounted such that at least two of the elastic members act in a series-like manner. Due to this, each receiver part is designed to have a long circumferential length. The present invention is more effective when used in the device thus constructed.

In the present invention as described above, torsion springs can be appropriately compressed and deformed in a lock-up device for a torque converter even, especially, when the torsion springs to be used have a shape elongated in the circumferential direction of the lock-up device. Additionally, degradation in strength of receiver parts of an input rotary member can be inhibited when the both circumferential ends of each receiver part are not processed by means of restriking.

DESCRIPTION OF EXEMPLARY EMBODIMENTS

Entire Construction of Torque Converter

Figure 1:
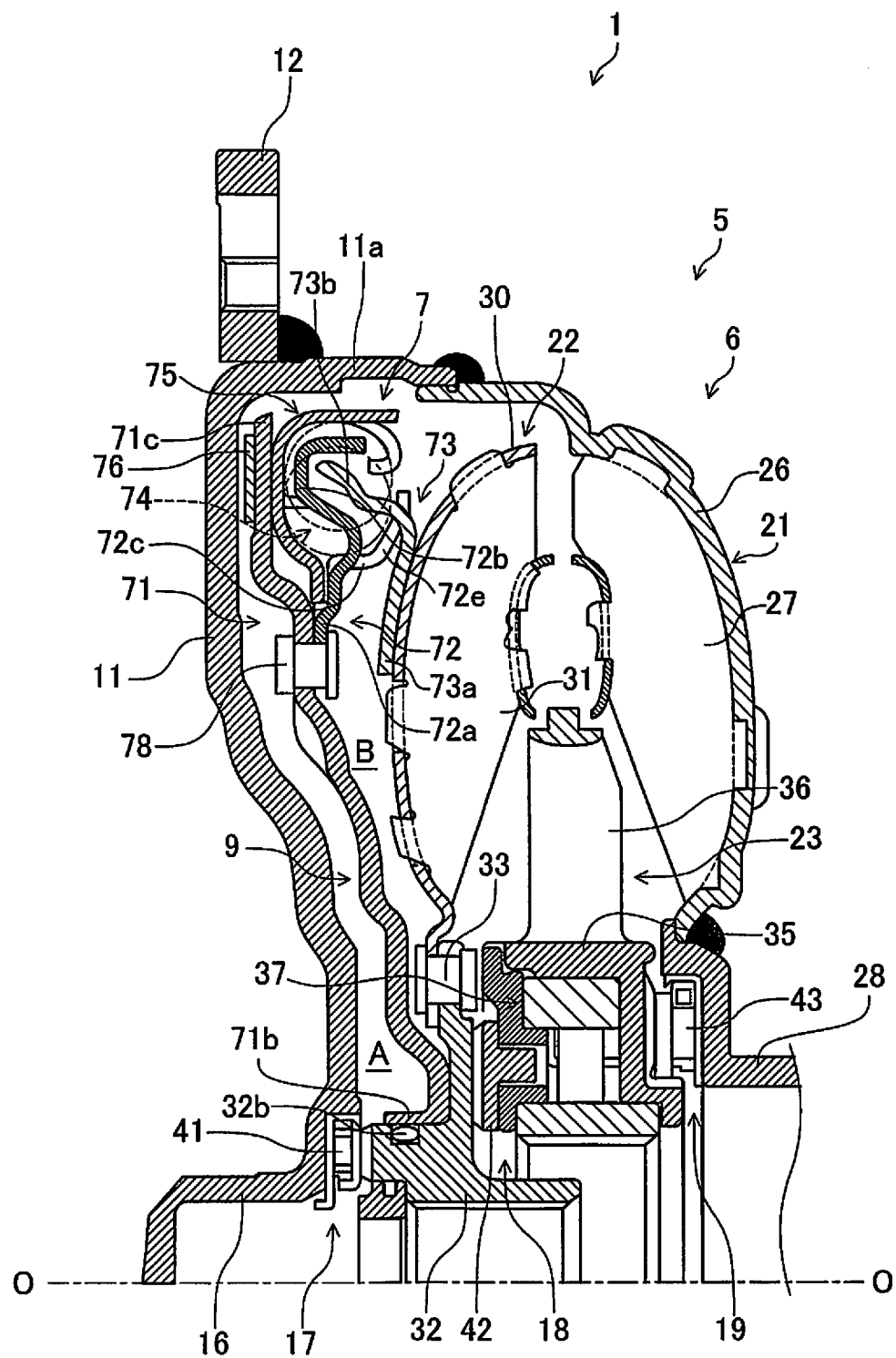
FIG. 1 is a partial cross-sectional view of a torque converter equipped with a lock-up device according to an exemplary embodiment of the present invention.
Figure 2:
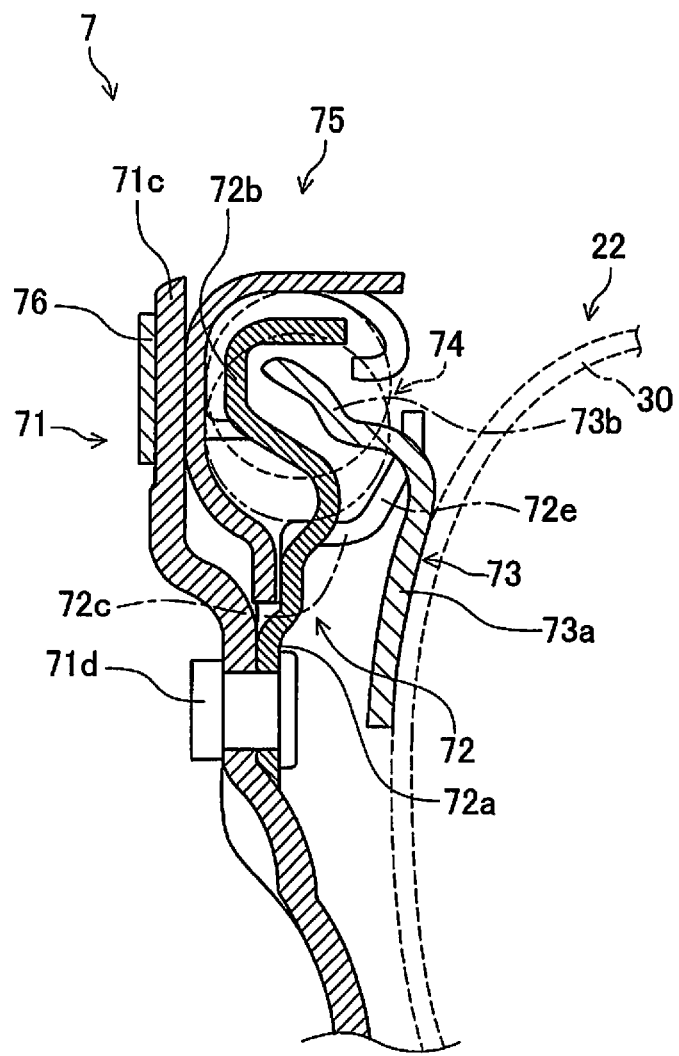
FIG. 2 is a partial enlarged view in cross section of the lock-up device of FIG. 1 taken along line 2-2 of FIG. 3.
Figure 3:
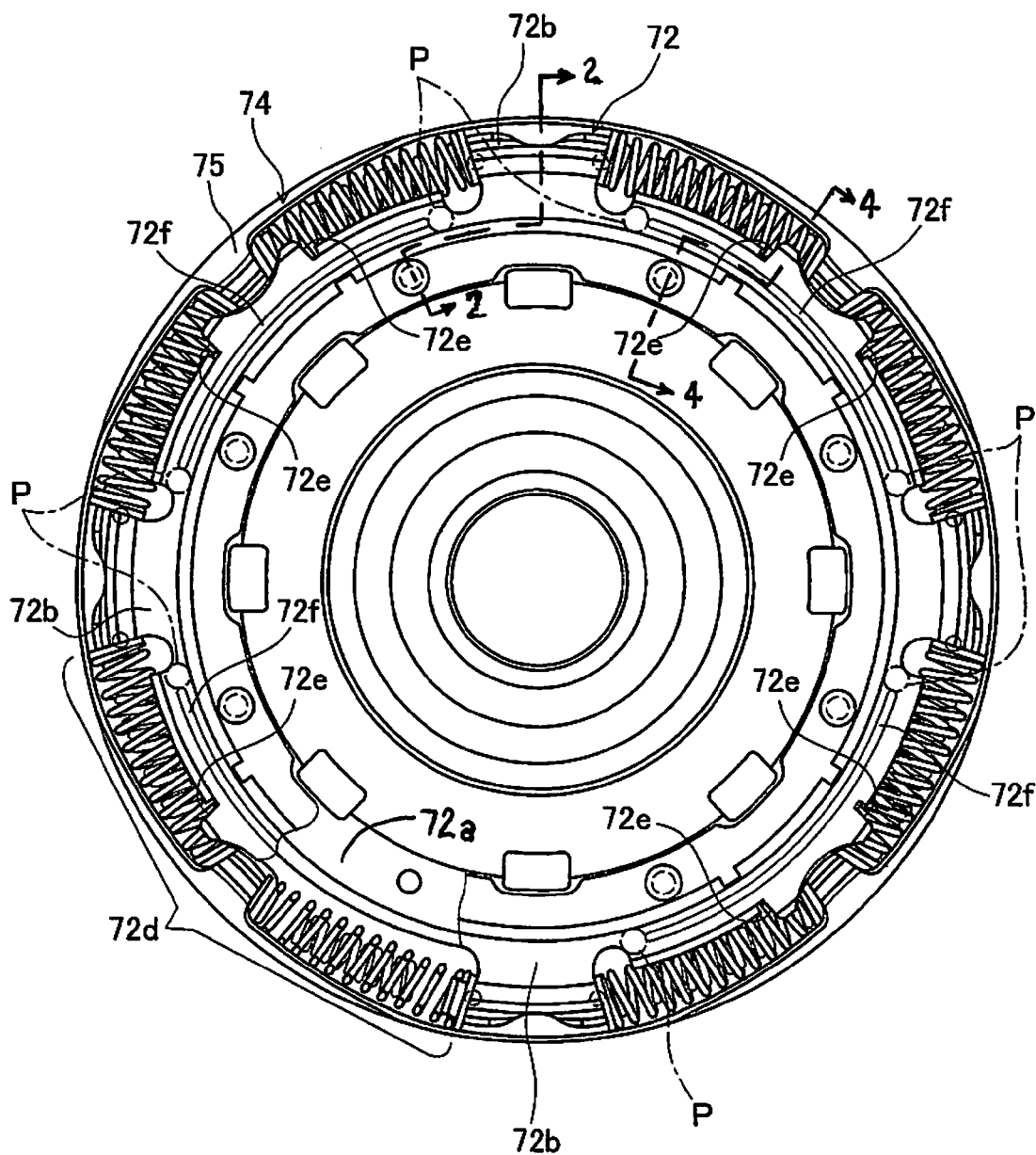
FIG. 3 is a front view of the lock-up device of FIG. 1.

FIG. 1 is a partial cross-sectional view of a torque converter 1 employing a lock-up device as an exemplary embodiment of the present invention. In FIG. 1, an engine (not shown in the drawing) is disposed on the left side, whereas a transmission (not shown in the drawing) is disposed on the right side. A line O-O depicted in FIG. 1 is a rotational axis for the torque converter and the lock-up device. FIG. 2 is a partial enlarged view of FIG. 1, whereas FIG. 3 is a front view of the lock-up device.

The torque converter 1 includes a torque converter body 5. The torque converter body 5 includes a torus-shaped fluid actuation chamber 6 made of three types of vane wheels (an impeller 21, a turbine 22 and a stator 23), a lock-up device 7 and a front cover 11.

The front cover 11 is a disc-shaped member and has a center boss 16 mounted to the inner peripheral end thereof. The center boss 16 is a cylindrical member extending in the axial direction and is inserted into a center hole of a crankshaft. A plurality of nuts 12 are fixed to the outer peripheral side of the front cover 11 while being circumferentially aligned at equal intervals. A flexible plate (not shown in the drawing) is fixed at the outer peripheral part thereof to the front cover 11 by bolts screwed into the nuts 12.

The impeller 21 includes an impeller shell 26, a plurality of impeller blades 27 fixed to the inside of the impeller shell 26, and an impeller hub 28 fixed to the inner peripheral part of the impeller shell 26. The outer peripheral edge of the impeller shell 26 is welded to the tip end of an outer peripheral tubular part 11a formed as the outer peripheral part of the front cover 11. As a result, the front cover 11 and the impeller 21 form a fluid chamber that the interior thereof is filled with operating oil.

The turbine 22 is disposed within the fluid chamber and is axially opposed to the impeller 21. The turbine 22 has a turbine shell 30, a plurality of turbine blades 31 fixed to the inside of the turbine shell 30, and a turbine hub 32 fixed to the inner peripheral edge of the turbine shell 30. The inner peripheral end of the turbine shell 30 is fixed to the turbine hub 32 by a plurality of rivets 33. Additionally, the turbine hub 32 has a spline on the inner peripheral surface thereof to be engaged with an input shaft. Thus, the turbine hub 32 is configured to be unitarily rotated with the input shaft.

The stator 23 is a mechanism for regulating the flow of the operating oil returning to the impeller 21 from the turbine 22, and is disposed between the inner peripheral part of the impeller 21 and that of the turbine 22. The stator 23 includes an annular stator shell 35 and a plurality of stator blades 36 mounted to the outer peripheral surface of the shell 35. The stator shell 35 is supported by a tubular stationary shaft (not shown in the drawing) through a one-way clutch 37. The stationary shaft extends between the outer peripheral surface of the input shaft and the inner peripheral surface of the impeller hub 28.

The torus-shaped fluid actuation chamber 6 is formed within the fluid chamber by the respective shells 26, 30 and 35 of the aforementioned respective vane wheels 21, 22 and 23. It should be noted that within the fluid chamber, an annular space 9 is reliably produced between the front cover 11 and the fluid actuation chamber 6.

A first thrust bearing 41 is disposed axially between the inner peripheral part of the front cover 11 and the turbine hub 32. A first port 17 is formed in a region to which the first thrust bearing 41 is mounted to enable the operating oil to radially flow therethrough. On the other hand, a thrust bushing 42 is disposed between the turbine hub 32 and the inner peripheral part of the stator 23 (specifically, the one-way clutch 37). A second port 18 is formed in a region in which the thrust bushing 42 is disposed to enable the operating oil to radially flow therethrough to both sides. Moreover, a second thrust bearing 43 is disposed axially between the stator 23 and the impeller 21. A third port 19 is formed in a region in which the second thrust bearing 43 is disposed to enable the operating oil to radially flow therethrough to both sides. It should be noted that oil paths are respectively connected to a hydraulic circuit (not shown in the drawings), and are configured to be capable of independently supplying/discharging the operating oil to/from the first to third ports 17 to 19.

Construction of Lock-Up Device

As shown in FIGS. 1 to 3, the lock-up device 7 is a mechanism disposed in the space 9 produced between the turbine 22 and the front cover 11 to mechanically couple the both components on an as-needed basis. The lock-up device 7 divides the space 9 into a first hydraulic chamber A, which is produced between the front cover 11 and the lock-up device 7, and a second hydraulic chamber B, which is produced between the lock-up device 7 and the turbine 22.

The lock-up device 7 includes a piston 71, a drive plate (input rotary member) 72, a driven plate (output rotary member) 73, a plurality of torsion springs 74 and an intermediate member 75.

The piston 71 is a member for engaging and disengaging a clutch, and has a disc shape with a center hole. The piston 71 has an inner peripheral tubular part 71b on the inner peripheral edge thereof, and the inner peripheral tubular part 71b extends axially toward the engine. The inner peripheral tubular part 71b is supported by the engine-side outer peripheral surface of the turbine hub 32 to be movable in the rotational direction and the axial direction. It should be noted that the piston 71 contacts the turbine hub 32 disposed on the transmission side thereof, and is thus restricted from moving axially toward the transmission.

Additionally, an annular seal ring 32b is mounted to the engine-side outer peripheral surface of the turbine hub 32 to contact the inner peripheral surface of the inner peripheral tubular part 71b. With this construction, the inner peripheral edge of the piston 71 is sealed. Moreover, an annular friction coupling part 71c is formed on the outer peripheral part of the piston 71. An annular friction facing 76 is attached to the axial engine side of the friction coupling part 71c.

The drive plate 72 is an annular member made of sheet metal and is disposed on the axial transmission side of the outer peripheral part of the piston 71. The drive plate 72 has a fixation part 72a, a plurality of torque transmission parts 72b, a plurality of receiver parts 72c, a plurality of spring accommodation parts 72d (see FIG. 3) and a plurality of engaging parts 72e.

The fixation part 72a contacts the axial transmission side surface of the piston 71, and is fixed to the piston 71 by a plurality of rivets 78. The plural torque transmission parts 72b extend from the fixation part 72a to the outer peripheral side, and make contact with the circumferential ends of the torsion springs 74.

Figure 4A:
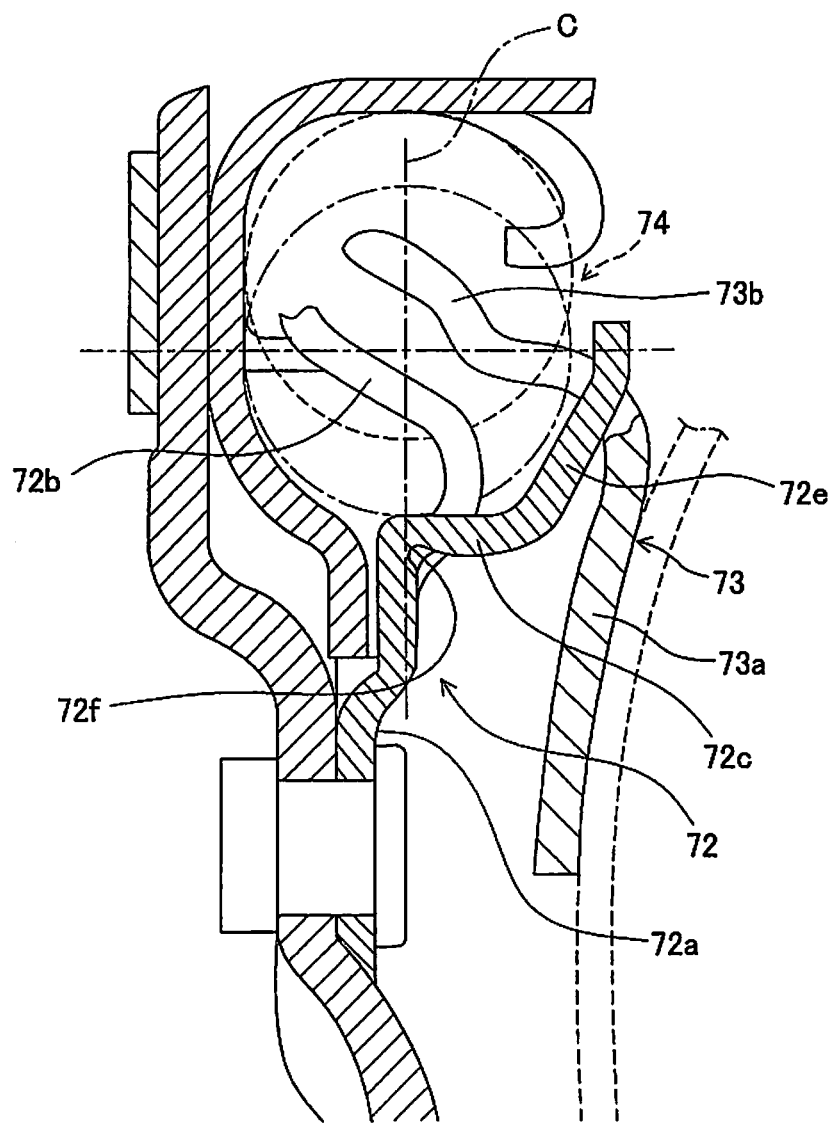
FIG. 4A is an enlarged view in cross section of a drive plate of FIG. 2 taken along line 4-4 of FIG. 3.
Figure 4B:
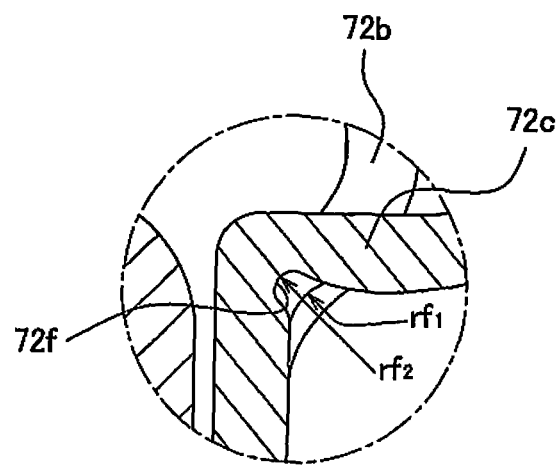
FIG. 4B is an enlarged view of the bent part of FIG. 4A.

The plural receiver parts 72c are formed on the outer peripheral part of the fixation part 72a. The receiver parts 72c are formed by bending the outer peripheral part of the fixation part 72a toward the transmission. Additionally, as shown in FIGS. 4A and 4B with enlarged views, the bent parts 72f are processed by means of restriking, and thus, the receiver parts 72c are formed to support the inner peripheral side parts of the torsion springs 74 on the engine side with respect to axial centers C of the torsion springs 74. It should be noted that as shown in FIG. 3, both circumferential ends (parts P in FIG. 3) of each receiver part 72c are not processed by means of restriking. Put differently, the bent part 72f in each receiver part 72c is processed by means of restriking except for the both circumferential ends thereof.

With this construction, in each receiver part 72c, both circumferential ends of the bent part 72f have fillet radii rf1 larger than the fillet radius rf2 (FIG. 1 FIGS. 4A and 4B) of the part processed by means of restriking.

As shown in FIG. 3, the spring accommodation parts 72d are located among the plural torque transmission parts 72b in the rotational direction. Each spring accommodation part 72d accommodates a pair of torsion springs 74. The torsion springs 74 elastically couple the drive plate 72 fixed to the piston 71 and the driven plate 73 in the rotational direction. The torsion springs 74 of each pair are disposed to act in series in the rotational direction.

The plural engaging parts 72e are shaped to extend from the receiver parts 72c to the further outer peripheral side and toward the transmission.

The driven plate 73 is a member for transmitting a torque from the torsion springs 74 to the turbine 22, and is mounted on the outer peripheral side of the turbine shell 30. The driven plate 73 has a mount part 73a and a plurality of pawls 73b. The mount part 73a is fixed to the turbine shell 30 by, for instance, welding. The plurality of pawls 73b are shaped to bend axially toward the engine at the outer peripheral edge of the mount part 73a. The pawls 73b are opposed to the torque transmission parts 72b of the drive plate 72 in the rotational direction. Additionally, the pawls 73b make contact with both circumferential ends of the torsion springs 74 disposed in the respective spring accommodation parts 72d.

The intermediate member 75 is a member for supporting the torsion springs 74 in the radial direction, and is disposed to be rotatable relative to the piston 71 and the driven plate 73. Additionally, the intermediate member 75 is disposed to be rotatable relative to the drive plate 72 and the driven plate 73.

Actions of Torque Converter

Immediately after starting of the engine, the operating oil is supplied to the interior of the torque converter body 5 through the first port 17 and the third port 19, whereas the operating oil is discharged through the second port 18. The operating oil supplied through the first port 17 flows through the first hydraulic chamber A to the outer peripheral side, passes through the second hydraulic chamber B, and flows into the fluid actuation chamber 6. With the mechanism, the piston 71 is moved to the transmission side by difference in hydraulic pressure between the first hydraulic chamber A and the second hydraulic chamber B. Put differently, the friction facing 76 separates from the front cover 11, and a lock-up state is released. During releasing of the lock-up state, a torque from the front cover 11 is transmitted to the turbine 22 through the operating oil.

Actions of Lock-Up Device

When the speed ratio of the torque converter 1 increases and the rotational speed of the input shaft reaches a predetermined speed, the operating oil in the first hydraulic chamber A is discharged through the first port 17. As a result, the piston 71 is moved toward the front cover 11 by a difference in hydraulic pressure between the first hydraulic chamber A and the second hydraulic chamber B, and the friction facing 76 is pressed onto the friction surface of the front cover 11. As a result, the torque of the front cover 11 is transmitted from the piston 71 to the driven plate 73 through the drive plate 72 and the torsion springs 74. Moreover, the torque is transmitted from the driven plate 73 to the turbine 22. Put differently, the front cover 11 is mechanically coupled to the turbine 22, and the torque of the front cover 11 is directly outputted to the input shaft through the turbine 22.

Features

In the present device, the receiver parts 72c of the drive plate 72 support the inner peripheral side parts of the torsion springs 74 on the engine side with respect to the centers of the torsion springs 74. With the construction, when the torsion springs 74 are compressed and deformed, the inner peripheral sides of the center parts of the torsion springs are reliably supported by the receiver parts 72c, and thus, the torsion springs 74 are prevented from being deformed and displaced to the inner peripheral side.

Additionally, the receiver parts 72c are formed by bending the outer peripheral part of the fixation part 72a by means of restriking. However, the both circumferential ends of each bent part 72f are not processed by means of restriking. With the construction, stress concentration on the both circumferential ends of each receiver part 72c can be avoided, and degradation in strength of each receiver part 72c can be inhibited.

Other Exemplary Embodiments

The present invention is not limited to the exemplary embodiment as described above, and a variety of changes or modifications can be herein made without departing from the scope of the present invention.

In the lock-up device for a torque converter of the present invention, even with use of, especially, torsion springs elongated in the circumferential direction of the lock-up device, the torsion springs can be appropriately compressed and deformed. Additionally, degradation in strength of receiver parts of an input rotary member can be inhibited when the both circumferential ends of each receiver part are not processed by means of restriking.

The invention claimed is:

1. A lock-up device for a torque converter for transmitting a torque from an engine to a transmission-side member and absorbing and attenuating a torsional vibration, comprising:
   an input rotary member;
   an output rotary member rotatable relative to the input rotary member and coupled to the transmission-side member; and
   a plurality of elastic members elastically coupling the input rotary member and the output rotary member in a rotational direction,
   the input rotary member including
      a fixation part fixed to a member to which the torque is inputted from the engine,
      a plurality of torque transmission parts formed to extend from the fixation part to an outer peripheral side and contacting rotation-direction ends of the plurality of elastic members, and
      a plurality of receiver parts formed on an outer peripheral part of the fixation part, supporting inner peripheral side parts of the elastic members on an engine side with respect to axial centers of the elastic members, and extending toward a transmission, a bent part in each of the plurality of receiver parts having a larger fillet radius in both circumferential ends thereof than in the remainder thereof.

2. The lock-up device for a torque converter recited in claim 1, wherein
   the fixation part has a disc shape, and
   the plurality of receiver parts are formed by bending the outer peripheral part of the fixation part toward the transmission.

3. The lock-up device for a torque converter recited in claim 2, further comprising
   an intermediate member rotatable relative to the input rotary member and the output rotary member and causing at least two of the plurality of elastic members to act in a series-like manner.

4. The lock-up device for a torque converter recited in claim 1, further comprising
   an intermediate member rotatable relative to the input rotary member and the output rotary member and causing at least two of the plurality of elastic members to act in a series-like manner.

* * * * *